United States Patent [19]
Heller et al.

[11] Patent Number: 4,846,239
[45] Date of Patent: Jul. 11, 1989

[54] TIRE CHANGING MACHINE WITH LOCKING CENTER POST

[76] Inventors: Stephen H. Heller, 6015 Macadam St., Agoura Hills, Calif. 91301; Gregory J. Owen, 26631 Loop Ave., Canyon Country, Calif. 91351; Thomas O'Key, 124 S. Alice Cir., Anaheim, Calif. 92806

[21] Appl. No.: 128,690

[22] Filed: Dec. 4, 1987

[51] Int. Cl.⁴ ............................................. B60C 25/04
[52] U.S. Cl. .................................... 157/1.3; 157/1.24
[58] Field of Search ...................... 157/1.22, 1.24, 1.3, 157/1.26, 1.28, 14

[56] References Cited

U.S. PATENT DOCUMENTS 2,034,819  3/1936  Maulis ................................ 157/1.24
3,717,193  2/1973  Craft .................................... 157/1.3

Primary Examiner—Debra Meislin
Attorney, Agent, or Firm—Frisenda, Morris & Nicholson

[57] ABSTRACT

A center post key for a tire changing apparatus is provided. The center post key includes a retractable projection on its side for preventing inadvertent dislodging of the tire iron during operation of the apparatus.

10 Claims, 4 Drawing Sheets

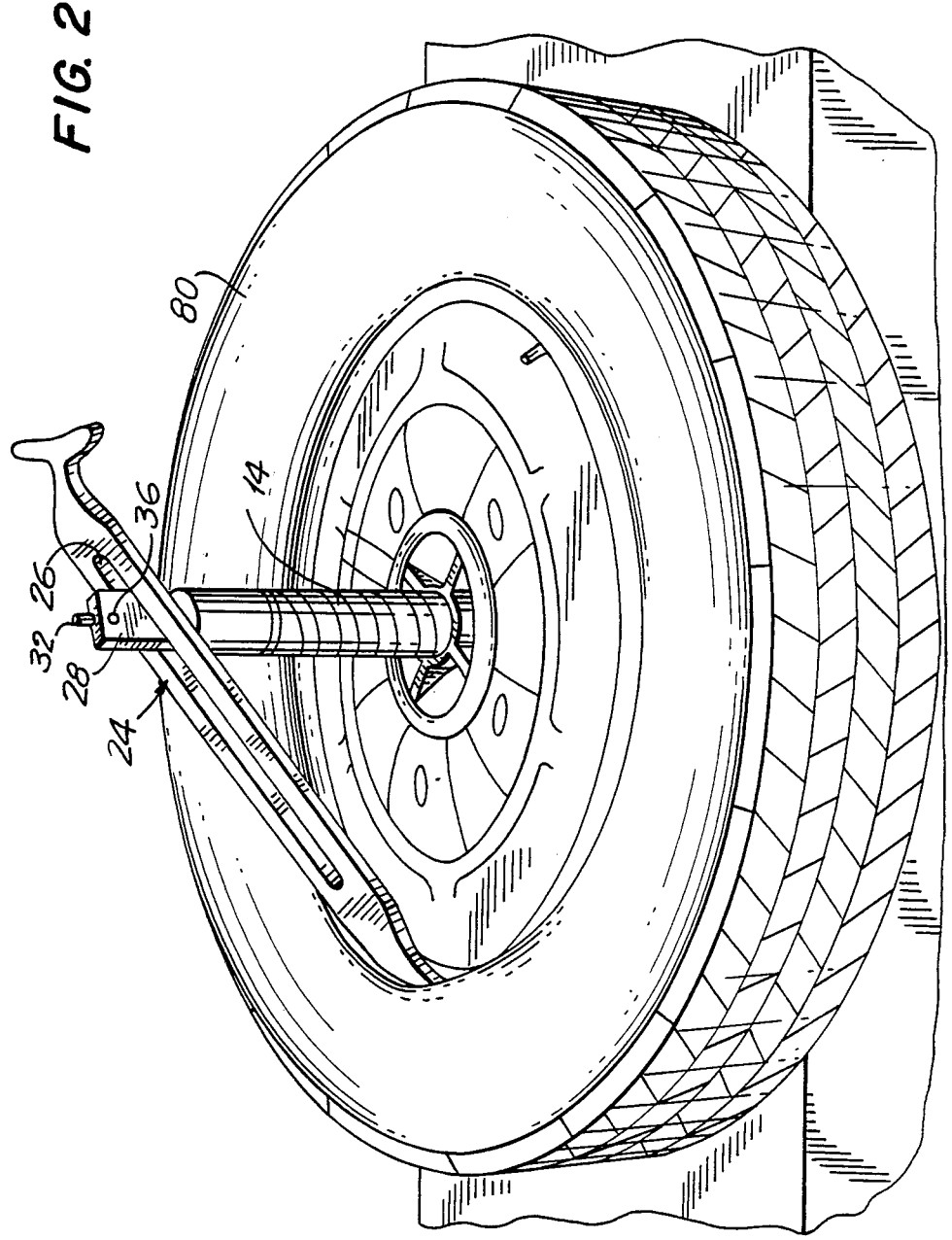

TIRE CHANGING MACHINE WITH LOCKING CENTER POST

BACKGROUND OF THE INVENTION

1. Field of the Invention

The present invention relates to a tire changing apparatus for mounting and dismounting tires from their rims. Typically, when a tire is mounted or dismounted from its rim, a tire changing machine is used in which the tire and wheel assembly are placed on a contoured table and over a center post. The tire is then secured to the table by a hold-down cone located around the center post. A tool which is similar to a tire iron having a slot is inserted between the tire and rim. This tool is often referred to as a combination tool. The tire iron is then rotated by hand to lift the tire bead over the rim. The hand rotation is continued until the tire iron slot is in full contact over the center post key. A foot pedal is then engaged and the center post key rotates counter clockwise, moves the tire iron and thus removes the upper tire bead from the rim. Specifically the claimed invention relates to a tire changing machine with a center post key that lockably holds the tire iron in place so that it cannot be dislodged accidentally during its mounting on the center post or during its rotation to remove the tire frm the wheel.

2. Description of the Prior Art

Tire mounting devices are well known in the prior art. For example, the Coats 40-40A mounting machine includes a contoured table top, a center post extending therefrom, a hold-down cone and a center post key. In the operation of the 40-40A machine, the tire iron is mounted onto a center post key or spindle which rotates during the mounting and demounting procedure. However, there is a problem in the prior art in that a spring-back condition manifests itself when the tire iron is placed over the center post key. The tire iron weighing about 7 pounds tends to flip back towards the operator in what is called a springback condition with resulting risk of injury to the operator. In the cycling mode the springback condition also occurs, particularly if the machine surges during cycling.

Attempts to solve the problem have been made. For example, a hole has been drilled in the center post key for receipt of a nut and bolt or a ball lock pin to secure the tire iron in place. However, such an arrangement is cumbersome. As a result of the number of additional steps required, the operator often will not take the time to insert the bolt and nut.

SUMMARY OF THE INVENTION

A tire mounting and demounting device is provided which securely locks the combination tool or tire iron in place during use so that inadvertent springback of the combination tool or tire iron is substantially reduced or eliminated.

According to the invention, a center post key having a withdrawable protruding projection on one side and a projection deactivator for selectively withdrawing the projection so that the tire iron or combination tool can be slid over the center post key is provided. After the tire iron is in place, the projection deactivator is released and the projection protrudes from the center post key to prevent the inadvertent dislodging of the tire iron or combination tool from the center post key. Hence, the tire iron or combination tool is locked in place and cannot fly off and hit the operator during the tire mounting or removal operation.

The combination tool or tire iron has a slot which is adapted for mounting on top of the center post key. The center post key includes a projection which when in its projecting position will prevent the removal of the tire iron or combination tool A projection deactivation mechanism is provided on the center post key for selectively withdrawing the projection to allow the tire iron to pass over the center post key. In operation, when the projection deactivator is in the projecting position the projection extends from the center post key and prevents the tire iron from being removed by extending a distance wider than the slot in the tire iron or combination tool. Thus, the tire iron or combination tool can only be removed by engaging the projection deactivator. As a result the tire iron or combination tool cannot fly off during operation of the tire changer and cause injury to the operator.

The preferred embodiment of the present invention is illustrated in the drawings. However, it should be expressly understood that the present invention should not be limited solely to the illustrative embodiment.

BRIEF DESCRIPTION OF THE DRAWINGS

FIG. 2 is a perspective view of the tire changing device of FIG. 1 in operation to remove a tire from the wheel.

DESCRIPTION OF THE PREFERRED EMBODIMENT

The present invention provides a tire changer which automatically locks in place the tire iron or combination tool used in the mounting or removal of a tire from its rim. As a result the tire iron cannot fly off and hit the operator during the tire mounting or removal operation. According to the invention, the center post key of the typical tire mounting device is modified to include a withdrawable protruding projection on one side and a projection deactivator for selectively withdrawing the projection so that the tire iron or combination of tool can be slid over the center post key. Once the tire iron is mounted over the center post key the projection protrudes from the center post key to prevent the dislodging of the tire iron or combination tool from the center post key.

Figure 1:
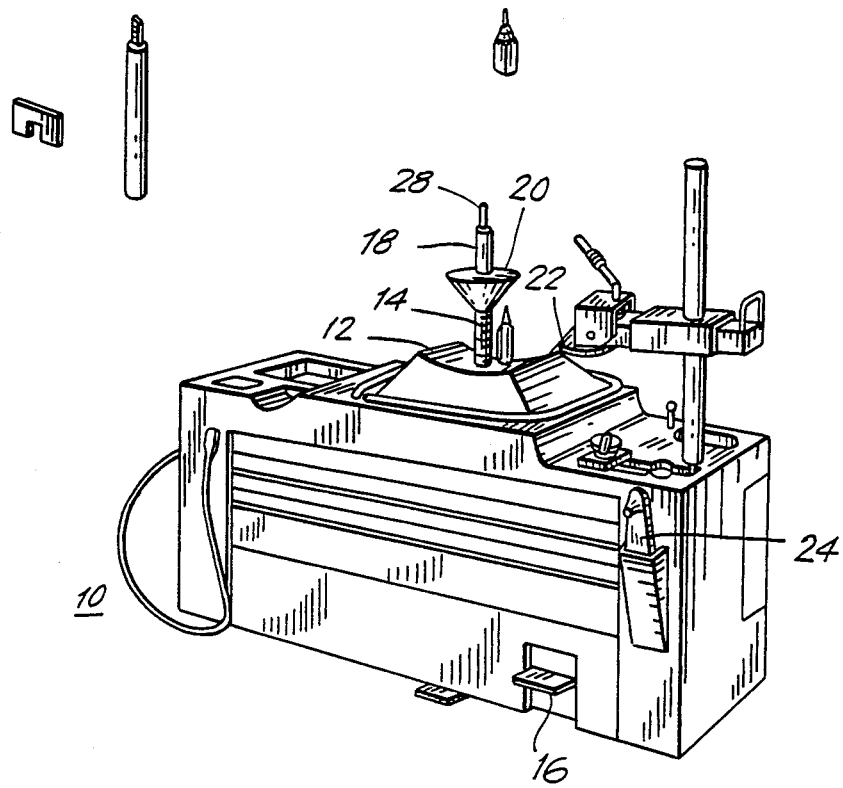
FIG. 1 is a front perspective view of a Coats 40-40A tire changing device.

As shown in FIG. 1, a tire changing machine such as the Coats 40-40A tire changer 10 having a contour table top 12 for holding a tire to which the wheel is to be mounted or demounted is provided. The tire changing machine 10 includes a center post 14 extending from the middle of the tire changer and rotatable upon activation of the foot pedal 16. A center post adaptor 18 can optionally be provided for larger size wheels. In operation, a tire 80 is placed on top of the counter table top 12 and through the middle of center post 14. A hold-down cone 20 is then threaded on the center post so that the end of the hold-down cone enters the tire rim center hole. The valve core is then removed and the pressurized air is allowed to escape. The upper bead loosener 22 is applied on the tire to loosen the bead from the rim. As best seen in FIG. 2, a tire iron or combination tool 24 having a slot 26 for mounting on center post key 28 which is an extension of center post 14 and rotates upon the activation of foot pedal 16 is used to ultimately remove the tire from the rim. In operation when foot pedal 16 is activated, center post key 28 powers tire iron or combination tool 24 which has been inserted between the tire and rim to either mount or demount the tire from the rim.

Figure 3A:
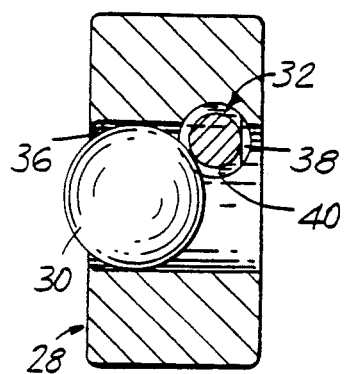
FIG. 3A is a top view of the center post key for use in the tire changing device of FIG. 1 with the ball in the projecting position.
Figure 4A:
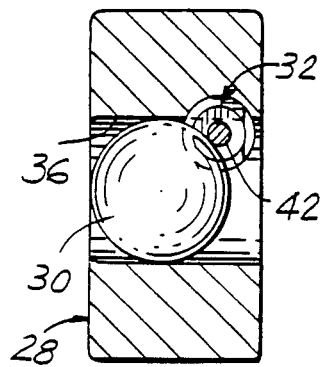
FIG. 4A is a top view of a center post key for use in the tire chaninging device of FIG. 1 with the ball in the retracting position.
Figure 3B:
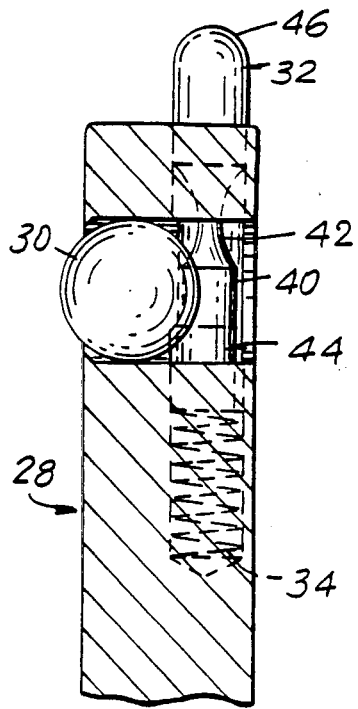
FIG. 3B is a side view of the center post key for use in the tire changing device of FIG. 1 with the ball in the projecting position.
Figure 4B:
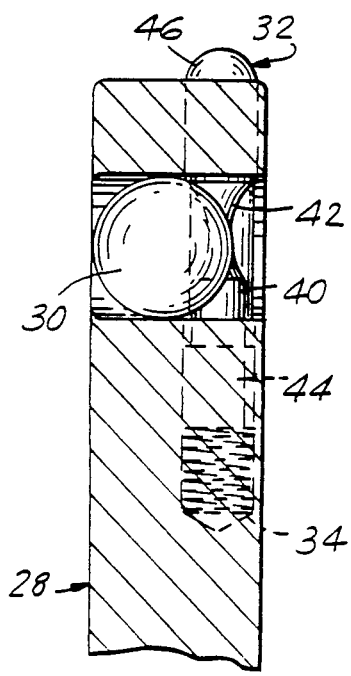
FIG. 4B is a side view of the center post key for use in the tire changing device of FIG. 1 with the ball in the retracting position.
Figure 5:
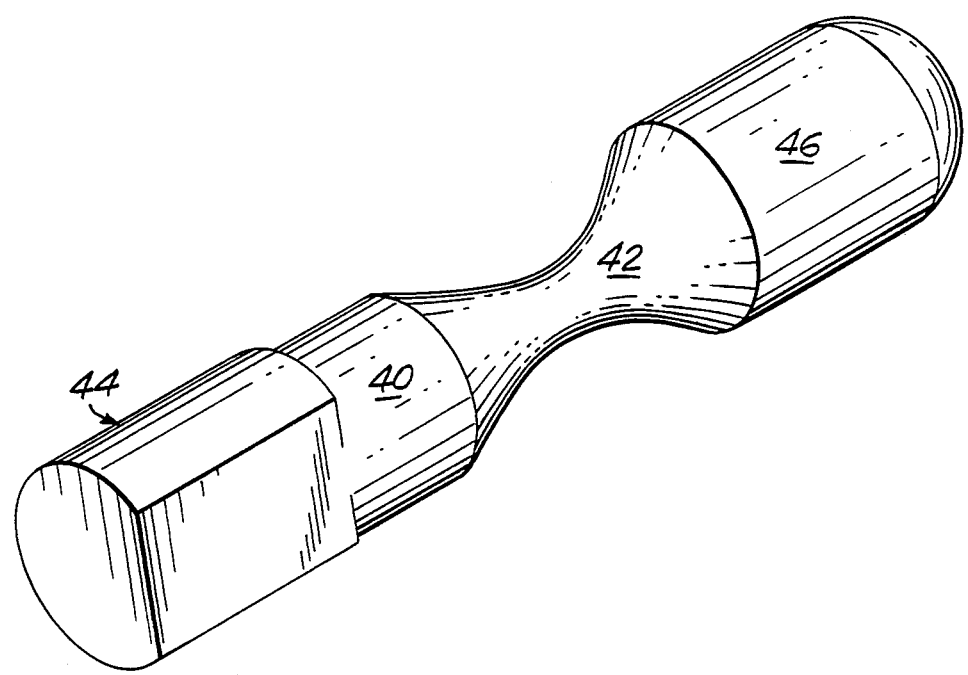
FIG. 5 is perspective view of a projection activation pin according to the invention.

According to the invention, as best seen in FIGS. 3 to 5 center post key includes a projection which retractably extends from the side of the center post key, for engagement with the slot 26 in the combination tool or tire iron 24. Examples of suitable retractable projections include biasely mounted projections located on the exterior of the center post key which are retractable upon a force applied from above or a retractable ball extending from the interior of the center post key. Preferabley the projection is a retractable ball 30. Preferably the projection ball 30 extends from the interior of center post key 28. A projection activator-deactivator such as pin 32 is preferable provided for thrusting ball 30 outwardly from center key post 28 and to allow the ball to be retracted into the interior of center key post 28. Thus, projection activator 32 has two positions, a first position which holds the projection outward so as to prevent the tire iron from passing over the projection and a second position which allows the projection to retract into the interior so that the tire iron or combination tool can be slipped past the projection and on or off the center post key 28.

Pin 32 preferably has various steps in diameter along its length. Preferably pin 32 has three different steps of differing diameter. Pin 32 has its largest diameter step 44 at its bottom. Adjacent to the bottom step is projection step 40 which is narrower in diameter than the bottom step 44. Projection step 40 is of sufficient diameter to hold ball 30 in its projecting position. A ball retraction step 42 is provided above projection step 40, step 42 has a small enough diameter to allow ball 30 to retract into the interior of center post key 28. Pin 32 is fitted into center post key 28 by inserting pin 32 through shaft 38 which is drilled through center key post 28 in the vertical direction. Hole 36 is drilled horizontally through center key post 28 so that it intersects shaft 38. Hole 36 aligns with shaft 38 so that when the pin 32 is in place in shaft 38, the ball 30 can be manipulated by moving pin 32 to align the projection step 40 or retraction step 42 with hole 36 and hence, project o retract the ball. A biasing means is provided at the end of shaft 38, preferably spring 34, or optionally a rubber bumper which holds the pin in its up position. In addition, the biasing means allows the pin to be readily placed in the retraction position by pressing down on pin 32. In the pin up position, the ball is forced to protrude outwardly from center post key 28 by the ball projection step 40 of the pin 32. Optionally to prevent the ball from falling out of hole 36, the hole 36 is first drilled undersize and then counter bored to provide a small ridge that engages the ball and prevents its removal. The ball in this position stops the pin from being removed by engaging the large diameter bottom part 44 of the pin 32. A flat surface 48 on the bottom of the pin allows for the assembly for the pin into the center key post 28. When it is assembled the flat surface is turned away from the ball to lock the pin in its hole. The pin is pushed down by pressing pin top 46. The ball release step of the pin 32 then aligns with hole 36 and allows the ball 30 to retract into the hole 36

Alternatively to keep the ball from escaping, pin 32 and spring 34 are inserted into shaft 38, then ball 30 is inserted into hole 36. The pin 32 is then pushed in to allow ball 30 to retract. The face of the hole 36 is then slightly swagged. This results in a small ridge on the edge of the hole that stops the ball 30 from falling out. Once swagged, the hole 36 stops the pin from escaping by the engagement of pin bottom diameter 44 by the swagged hole 30.

In operation when a tire iron 24 having a slot 26 is passed over center key post 28, the operator presses down on pin top 46 with one hand. Ball 30 retracts into the interior of center post key 28 and allows tire iron 24 to slide over center post key 28 for mounting. After the tire iron has been placed over center post key 28 and by ball 30, pin 32 is released and ball 30 is held in its outward projecting position by pin 32 at large diameter 40. As a result, the tire iron 24 is held in place during use of tire changing machine 10. The operator does not have to perform any additional steps to secure the tire iron for safe operation.

The foregoing is considered a illustrative only to the principles of the invention. Further, since numerous changes and modifications will occur to those skilled in the art, it is not desired to limit the invention to the exact construction and operation shown and described above, and accordingly all suitable modifications and equivalents may be resorted to, falling within the scope of the invention.

We claim:
1. A tire changing machine for mounting and demounting tires from rims comprising:
(a) a table for receipt of a tire;
(b) a rotatable center post extending from said table;
(c) a center post key extending from said center post;
(d) a tire iron having a slot, said tire iron mountable upon said center post key through said slot;
(e) means to rotate said center post key and said mounted tire iron to mount and demount the tire on a rim;
(f) said center post key having a projection means thereon;
(g) said projection means extending outwardly from said center post key a sufficient distance to prevent passage of said tire iron over said center post key;
(h) retraction means located on said center post key to selectively retract said projection on said center post key to allow the passage of said center post key through the slot of said tire iron;
(i) said projection means and said retraction means fixedly secured to said center post key during the mounting of said tire iron on said center post key and during the mounting and demounting of the tire on the rim;
whereby said tire iron is held in place by said projection means to prevent the tire iron from flying offf said center post key during the mounting or demounting process.

2. A center post key for use on a tire changing machine which mount or demount a tire from a wheel by the action of a rotating tire iron mounted on a center post key through a slot on the tire iron comprising:

a post mountable on the rotatable center post of said tire changing machine;

said post having projection means extending from a side of said post a sufficient distance to prevent the passage of said tire iron over said post through said tire iron slot;

retraction means mounted on said post to selectively retract said projection means so said post can pass thorugh said slot of said tire iron;

said projection and said retraction means fixedly secured to said post during the mounting of said tire iron on said center post key and during the mounting and demounting of the tires on the rim;

whereby said tire iron is held in place by said projection means to prevent said tire iron from flying off said center post key during operation of the tire changing machine.

3. A center post key according to claim 2 wherein said projection means includes a ball retractably extending from a hole in said post;

said ball having a projection position to prevent the passage of said tire iron slot over said post and a retraction position to allow passage of said post through said tire iron slot when said ball is in said retraction position;

said retraction means including a pin;

a vertical shaft in said post for receiving said pin;

said vertical shaft intersecting said hole to allow interaction between said pin and said ball;

said pin having a first step and a second step of differing diameter;

said pin having a ball projection position and a ball retractin position;

said pin first step aligning with said hole when said pin is in the ball projection position and said second step aligning with said hole when said pin is in the ball retraction position;

biasing means to hold said pin in the ball projection position and to allow said pin to be moved into a ball retraction position upon the application of a downward force;

said pin first step having a large enough diameter to interact with said ball when said pin is in said ball projection position to hold said ball in its projection position;

said pin second step having a small enough diameter to allow said ball into said ball retraction position to allow passage of the tire iron slot over said post.

4. A center post key according to claim 3 wherein said projection means further comprising pin movement means located on the top of said post to move said pin into the ball retraction position.

5. A center post key according to claim 3 further comprising, said pin having a third step at the bottom of said pin, the diameter of said third step being larger than the diameter of said first or second step;

means to prevent said third step from passing by said hole.

6. The tire changing apparatus according to claim 1 wherein said projection means includes a ball fixedly mounted to said center post key and retractably extending therefrom;

said retraction means includes a pin fixedly secured to said center post key and having an up and down position so that when said pin is pushed into said down position said ball retracts into said center post key and when said pin is released, said ball extends from said center post key to held said tire iron in place.

7. A tire changing machine according to claim 1 wherein said projection means includes a ball retractably extending from a hole in said center post key;

said ball having a projection position to prevent the passage of said tire iron slot over said center post key and a retraction position to allow passage of said center post key through said tire iron slot when said ball is in said retraction position;

said retraction means including a pin;

a vertical shaft intersecting said hole to allow interaction between said pin and said ball;

said pin having a first step and a second step of differing diameter;

said pin having a ball projection position and a ball retraction position;

said pin first step aligning with said hole when said pin is in the ball projection position and said second step aligning with said hole when said pin is in the ball retraction position;

biasing means to hold said pin in the ball projection position and to allow said pin to be moved into a ball retraction position upon the application of a downward force;

said pin first step having a large enough diameter to interact with said ball when said pin is in said ball projection position to hold said ball in its projection position;

said pin second step having a small enough diameter to allow said ball into said ball retraction position to allow passage of the tire iron slot over said post.

8. A tire changing machine according to claim 7 wherein said projection means further comprising pin movement means located on the top of said center post key to move said pin into the ball retraction position.

9. A tire changing machine according to claim 7 further comprising, said pin having a third step at the bottom of said pin, the diameter of said third step being larger than the diameter of said first or second step;

means to prevent said third step from passing by said hole.

10. The center post key according to claim 2 wherein said projection means includes a ball fixedly mounted to said post and retractably extending therefrom;

said retraction means includes a pin fixedly secured to said post and having an up and down position so that when said pin is pushed into said down position said ball retracts into said post and when said pin is released, said ball extends from said post to hold said tire iron in place.

\* \* \* \* \*